United States Patent Office 3,434,858
Patented Mar. 25, 1969

3,434,858
HEAT-SEALABLE READILY DRAPING FABRIC AND METHOD OF MAKING IT
Sanford C. Dickinson, North White Plains, N.Y., assignor to Joseph A. Kaplan & Sons, Inc., a corporation of New York
No Drawing. Filed Oct. 4, 1965, Ser. No. 492,938
Int. Cl. B44c 1/08
U.S. Cl. 117—9                9 Claims

ABSTRACT OF THE DISCLOSURE

Vinyl sheet provided with a multiplicity of minute holes carries on at least one surface a flocking composed entirely of short fibres of pure vinyl. Fibres secured to sheet by a vinyl adhesive.

---

This invention relates generally to fabrics, and has particular reference to fabrics of heat-sealable character.

It is the general object of the invention to provide a heat-sealable fabric having improved qualities making it suitable for use in the manufacture of garments and other products in which softness and ready draping qualities are desirable.

It is another object of the invention to provide an improved manufacturing procedure for making a heat-sealable fabric of the character described, the procedure being thoroughly practicable on a commercial scale.

A more particular object of the invention is to achieve the desired results by recourse to the heat-sealing properties of polyvinyl chloride (hereinafter referred to as "vinyl"). Sheets of this material have been commonly employed for shower curtains and similar products. Seams can be produced quickly and efficiently by subjecting the material to appropriate electrodes. Usually a high-frequency electric current is employed, engendering an internal heat which melts the vinyl and brings about a merger of the overlying layers to be joined.

Vinyl sheets have never been suitable for garments or for other articles requiring softness and draping qualities. Vinyl is generally stiff, clammy and uncomfortable to the touch, and has no "breathing" qualities.

It is an object of the present invention to overcome the shortcomings of vinyl, and to provide a heatsealable material having the desirable heat-sealing qualities of vinyl and being, in addition, soft and comfortable to the touch, pliable, good looking, of easy draping character, and, most important of all, having an ability to "breathe," i.e., to allow the passage of air through it.

Briefly stated, the improved fabric consists of a sheet of vinyl provided with a multiplicity of minute holes and carrying, on at least one surface and preferably on both surfaces, a flocking composed entirely of short fibres of pure vinyl. Preferably the flocking is adhered to the base sheet by a vinyl adhesive, i.e., an adhesive relying for its action upon a solvent for vinyl, whereby the desired adhesion is brought about by a merging of the materials to be held together.

It is a feature of the invention to provide a vinyl sheet having the desired thinness to impart easy draping qualities; to provide a multiplicity of minute openings in sufficient quantities to impart a "breathing" quality to the sheet; and to employ flocking whose denier and length are such that the holes are concealed, on the flocked surface or surfaces, yet remain sufficiently open to permit the passage of air through the fabric.

The preferred procedure whereby these desired results may be achieved, is carried out as follows.

A vinyl sheet is provided, having a thickness of from .003 to .040 inch. Within this range of thickness, vinyl sheet material has adequate pliability to impart ready draping qualities to the resultant fabric. The vinyl sheet may be produced in accordance with any known procedures, and it will embody whatever pigments, fillers, stabilizers, and plastizers are required to impart the desired flexibility to the sheet.

The sheet is subjected to a perforating procedure which forms a multiplicity of holes in it. These holes will have diameters of the order of about $\frac{1}{32}$ of an inch, and they will number about 40 per square inch of sheet. Round holes are preferable, but it is not essential that they be absolutely round. Somewhat larger or smaller holes can be provided, and there can be more or less holes than 40 per square inch, depending on the breathability to be imparted to the end product.

In producing a fabric in which flocking is to be applied to only one surface of the sheet, the surface to be flocked is then coated with a vinyl adhesive, and thereupon the sheet is subjected to a flocking procedure. This procedure can involve known techniques, which may be either mechanical or electrostatic in nature. The flocking fibres are composed of pure vinyl, they are of appropriate denier, say from 2.5 to 15 denier, and they have lengths of from .005 to .15 inch. The fibres might be dropped, for example, from a revolving drum, onto the adhesive-bearing surface of the vinyl sheet. After covering the desired area, the sheet can be passed over a vibrating belt or the like which causes the fibres to settle themselves deeper into the adhesive. The sheet can then be passed through a brushing or cleaning station where excess fibres are removed.

The fibres applied as flocking are chosen with due regard to the number and size of holes in the base fabric, the appearance and feel desired, and the use for which the fabric is intended. In order that the fibres may effectively conceal the holes, yet allow the holes to remain sufficiently open to permit passage of air through the fabric, it is generally advisable to employ smaller deniers and shorter lengths with smaller holes. By way of example, a highly satisfactory fabric for garment manufacture is produced by providing about 40 holes per square inch, each hole being about $\frac{1}{32}$ of an inch in diameter, and flocking with fibres of about 3.5 denier and about .06 inch long.

If the fabric is to be flocked on both surfaces, a similar procedure is followed, except that it has been found preferable to perform the perforating operation between the application of flock to the opposed surfaces. More particularly, the original sheet is first coated on one surface with a vinyl adhesive, flocking is applied to that surface, the sheet is then subjected to the formation of holes of the character described, adhesive is applied to the second surface, and flocking is then applied to the latter surface. It has been found that this sequence of steps is better suited to a retention of the "breathing" qualities desired.

Whether the fabric is coated on one or both sides with the vinyl fibres, it may be finally subjected, if desired, to a water repellent. This treatment with a water repellent may be of any known character. Under certain circumstances, the vinyl fibres may be treated with a water repellent before they are applied as flock to the base sheet of vinyl.

A fabric produced in accordance with the procedure described is warm and comfortable to the touch, it is flexible to a degree which allows it to be draped readily and attractively, and it has an ability to "breathe," thus making it entirely satisfactory as a garment material. Of primry importance is the fact that the fabric is entirely heat-sealable, i.e., the various sections of the garment may be cut in accordance with conventional procedures, and then joined together along their edges by simple and known heat-sealing techniques rather than by stitching.

It will be understood, of course, that the fabric described is not restricted in its utility to the manufacturer of garments. Moreover, except as hereinbefore specified, the details of the procedure and of the resultant product may be modified in numerous respects by those skilled in the art without necessarily departing from the spirit and scope of the invention as expressed in the appended claims.

What is claimed is:

1. The method of making a soft readily draping fabric of heat-sealable character, which consists in:
   providing a self-sustaining unsupported sheet of thin pliable vinyl having a thickness of from .003 to .040 inch,
   forming a multiplicity of holes therein, having diameters of the order of about $\frac{1}{32}$ inch, coating at least one surface of the sheet with a heat-sealable vinyl adhesive, and
   flocking the sheet on at least said one surface exclusively with vinyl fibres of such length and denier that the holes are effectively concealed but left open enough to permit free passage of air.

2. The method defined in claim 1, including also the step of treating the flocked sheet with a water repellent.

3. The method defined in claim 1, including applying the adhesive and flocking fibers to both surfaces of the sheet.

4. The method of making a soft readily draping fabric of heat-sealable character, which consists in forming a multiplicity of holes in a self-sustaining unsupported vinyl sheet, said sheet having a thickness of from .003 to .040 inch, said holes numbering about 40 per square inch and having diameters of the order of $\frac{1}{32}$ inch, coating at least one surface of the sheet with a heat-sealable vinyl adhesive, and flocking the sheet on at least said one surface exclusively with vinyl fibers of such denier and length that the holes become effectively hidden yet remain sufficiently open to permit free passage of air through them.

5. The method of soft readily draping fabric of heat-sealable character, which consists in:
   providing a self-sustaining unsupported sheet of thin pliable vinyl having a thickness of from .003 to .040 inch,
   coating one surface of the sheet with a heat-sealable vinyl adhesive,
   flocking the sheet on said one surface exclusively with vinyl fibres,
   forming a multiplicity of holes in said sheet, said holes having diameters of the order of about $\frac{1}{32}$ inch,
   coating the other surface of the sheet with a heat-sealable vinyl adhesive, and
   flocking the sheet on said other surface exclusively with vinyl fibers of such length and denier that the holes are effectively concealed but left open enough to permit free passage of air.

6. A soft readily draping fabric of heat-sealable character, comprising a self-sustaining and unsupported vinyl sheet having a multiplicity of minute holes through it and flocked exclusively with vinyl fibers on at least one surface thereof, a vinyl adhesive securing said fibres to said sheet, the fibres being of such denier and length that the holes are effectively concealed on the flocked surface yet sufficiently open to permit the fabric to "breathe."

7. A fabric as defined in claim 6 in which both surfaces bear adhesive and flocking fibers as described.

8. A fabric as defined in claim 7 in which the sheet has an initial thickness of from .003 to .040 inch, and the fibres have a denier of from 2.5 to 15 and a length of from .005 to .15 inch; and in which the fibres are held on the sheet by a vinyl adhesive.

9. A fabric as defined in claim 8, in which the holes have diameters of the order of $\frac{1}{32}$ inch, and the fibres are of about 3.5 denier and about .06 inch long.

References Cited

UNITED STATES PATENTS

| | | | |
|---|---|---|---|
| 2,135,901 | 11/1938 | Lea | 117—4 X |
| 2,308,429 | 1/1943 | Smith et al. | 117—28 X |
| 2,527,501 | 10/1950 | Saks | 117—17 X |
| 2,784,630 | 3/1957 | Koprow et al. | 117—33 X |
| 2,913,729 | 11/1959 | Wisenburg | 117—4 |
| 3,215,552 | 11/1965 | Halcomb et al. | 117—4 |
| 3,275,487 | 9/1966 | Lemelson | 156—72 |
| 3,357,848 | 12/1967 | Donahue et al. | 117—28 |

OTHER REFERENCES

Phillips, A. L., Flock Finishing, Part I, October 1952, p. 12.

WILLLIAM D. MARTIN, *Primary Examiner.*

U.S. Cl. X.R.

117—24, 28, 33